United States Patent
Park et al.

(10) Patent No.: US 7,040,698 B2
(45) Date of Patent: May 9, 2006

(54) HEADREST MOUNTED VIDEO DISPLAY

(75) Inventors: Eric Park, Rowland Heights, CA (US); Jung Ho Son, Stevenson Ranch, CA (US)

(73) Assignee: SAVV Corporation, Cerritos, CA (US)

( * ) Notice: Subject to any disclaimer, the term of this patent is extended or adjusted under 35 U.S.C. 154(b) by 0 days.

(21) Appl. No.: 10/610,956

(22) Filed: Jul. 1, 2003

(65) Prior Publication Data

US 2004/0007906 A1 Jan. 15, 2004

Related U.S. Application Data

(63) Continuation-in-part of application No. 10/188,662, filed on Jul. 2, 2002, now Pat. No. 6,669,285.

(51) Int. Cl.
*B60R 11/02* (2006.01)
*A47C 7/72* (2006.01)

(52) U.S. Cl. .................................. 297/217.3; 348/837

(58) Field of Classification Search ............ 297/217.3, 297/217.1, 188.04, 188.05; 348/837, 838
See application file for complete search history.

(56) References Cited

U.S. PATENT DOCUMENTS

| | | | | |
|---|---|---|---|---|
| 3,019,050 A * | 1/1962 | Spielman | ................. | 297/217.3 |
| RE33,423 E * | 11/1990 | Lobanoff | .................... | 297/410 |
| 5,267,775 A * | 12/1993 | Nguyen | ................... | 297/217.3 |
| 5,507,556 A * | 4/1996 | Dixon | ...................... | 297/217.3 |
| 5,566,224 A * | 10/1996 | ul Azam et al. | ............. | 379/58 |
| 5,713,633 A * | 2/1998 | Lu | ........................... | 297/217.3 |
| 6,045,181 A * | 4/2000 | Ikeda et al. | ............ | 297/216.12 |
| 6,394,551 B1 * | 5/2002 | Beukema | .................... | 297/391 |
| 6,406,334 B1 * | 6/2002 | Chu | ......................... | 297/217.3 |
| 6,698,832 B1 * | 3/2004 | Boudinot | ................. | 297/217.3 |
| 2003/0107248 A1 * | 6/2003 | Sanford et al. | .......... | 297/217.3 |

* cited by examiner

*Primary Examiner*—Peter R. Brown
(74) *Attorney, Agent, or Firm*—Jenkens & Gilchrist

(57) ABSTRACT

An embodiment of the invention has a headrest restraint incorporating a remote-controlled, video monitor with a monitor safety cover and concealed video input and power supply cable. It can serve as an OEM headrest or as an after-market headrest replacement. This embodiment of the invention maintains headrest safety requirements and meets vehicle manufacturers' specifications, unlike headrests specially modified to incorporate a rearward facing video monitor. The monitor safety cover protects rear seat occupants from impact with the monitor. The abstract is submitted with the understanding that it will not be used to interpret or limit the scope or meaning of the claims. 37 CFR 1.72(b).

17 Claims, 9 Drawing Sheets

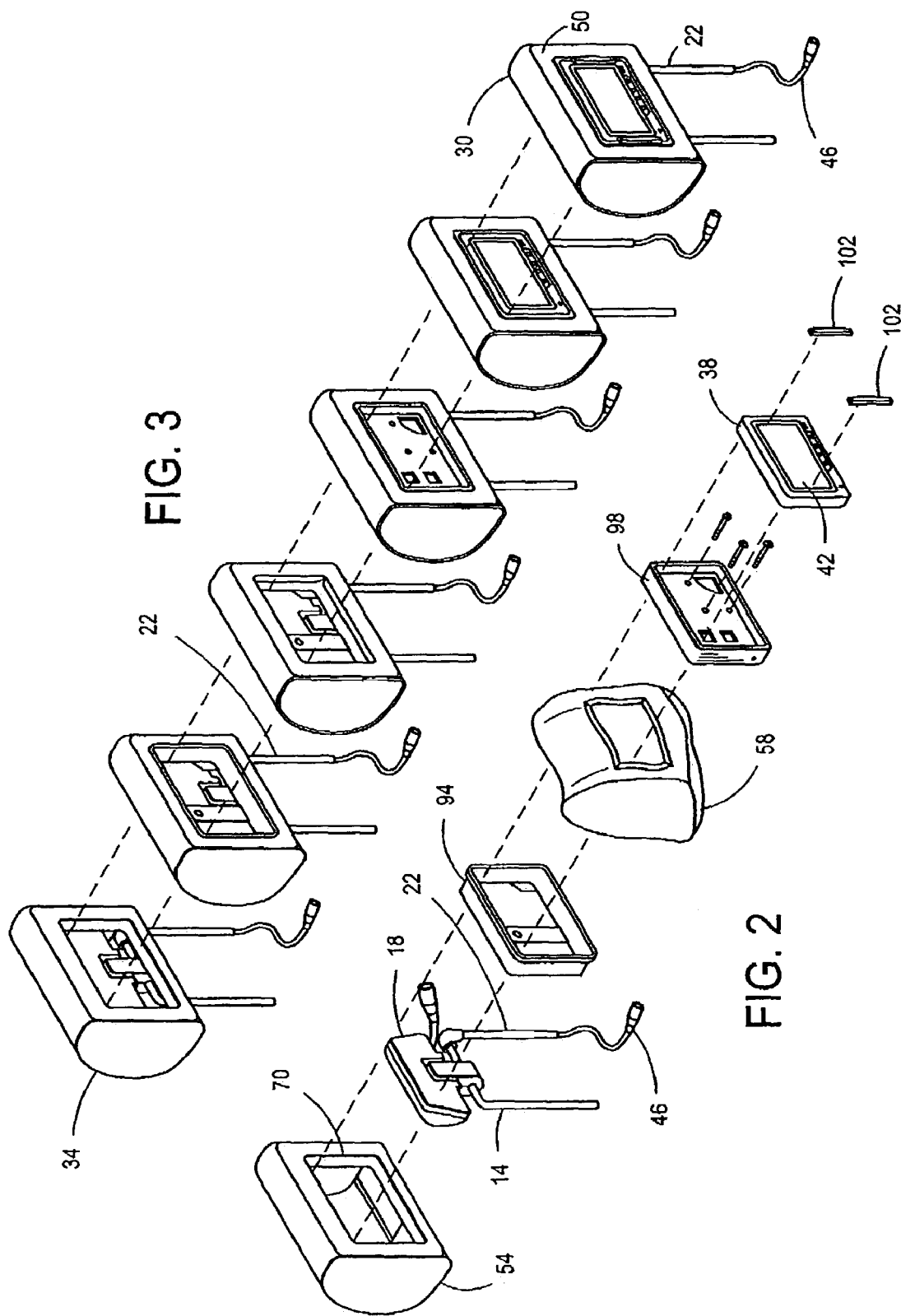

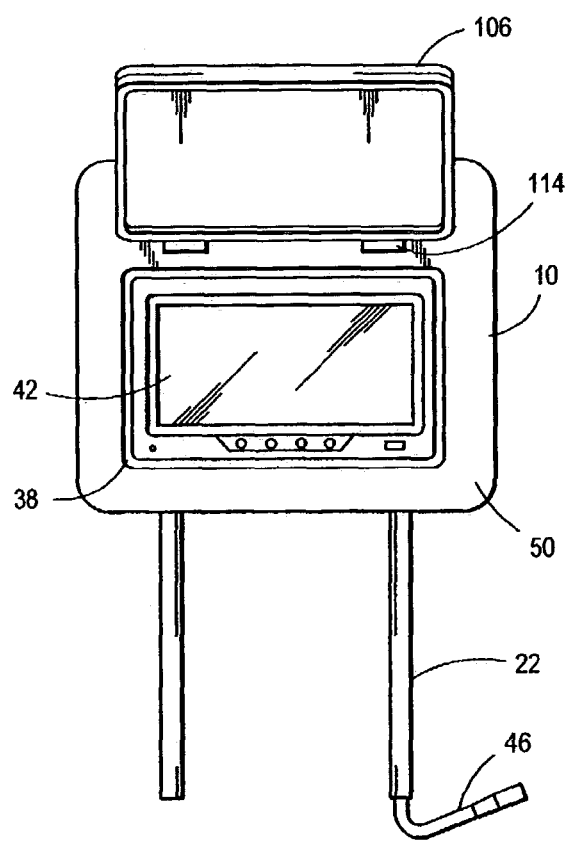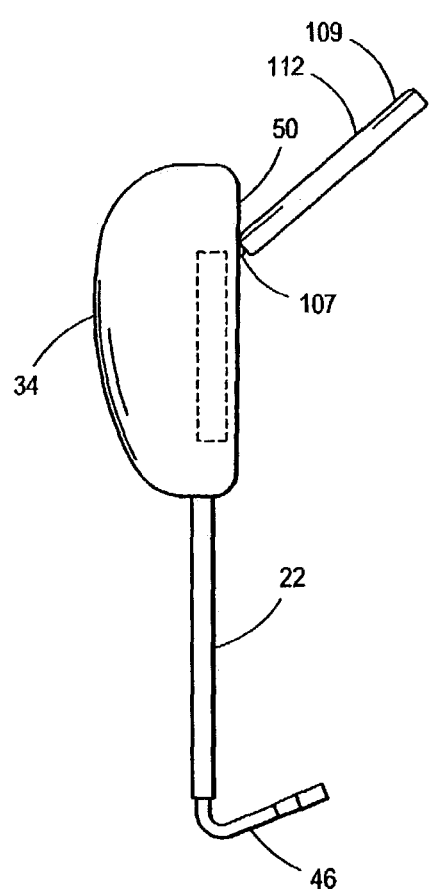
FIG. 12                    FIG. 13

HEADREST MOUNTED VIDEO DISPLAY

This is a continuation-in-part of application Ser. No. 10/188,662, Jul. 2, 2002, now U.S. Pat. No. 6,669,285.

BACKGROUND OF THE INVENTION

1. Field of Invention

The present invention relates generally to the field of vehicle accessories and more particularly to the field of an OEM replacement vehicle headrest with a built-in LCD display.

2. Background Information

Currently, there is no Original Equipment Manufacturer (OEM) headrest restraint incorporating a rearward facing video monitor manufactured specifically for vehicles. Typically, headrests with a rearward facing video monitor are specially modified to incorporate it. They do not include a rearward facing remote-controlled video monitor with a monitor safety cover and concealed video input and power supply cable.

The automobile has replaced the dining room as the family gathering place. Parents are often shuttling children from one event or function to another, such as baseball and ballet practice. Families are purchasing larger vehicles to accommodate the family's needs. This has resulted in a dramatic rise in the number of four door vehicles sold in the United States. Sport-utility-vehicle (SUV) sales account for almost half of the new automobiles sold in this country. Passengers are spending an increasing amount of time in their automobiles.

The demands of modern society have made two income families the norm rather than the exception. One or both parents may be commuting to work on a regular basis. The search for affordable housing has forced many people to live great distances from their place of employment resulting in long commutes. These two factors, along with many others, force commuters to spend ever-increasing amounts of time driving to and from work. Many commuters have discovered that car-pooling to share the driving responsibilities and expenses and to take advantage of the time saving features of the car pool lanes reduces the chore associated with driving to work. As society becomes more urbanized, the time spent commuting by automobile continues to increase. Passengers are spending an increasing amount of time in their automobiles.

The time spent commuting passes more quickly for the passengers when they are engaged. Increasingly, vehicles have become equipped with audio and video equipment intended to keep the passengers entertained while commuting. The passengers can now interact with the Internet, work on a computer, play video games or watch video entertainment. Manufacturers have equipped passenger vehicles, for several years, with video entertainment systems. Large vehicles, such as vans or SUV's often have video monitors hanging from the ceiling, mounted in the dashboard, center armrest or mounted in the back of a headrest or seat.

Typically, a craftsman modifies the backside of an original equipment headrest to receive a video monitor. This is a very expensive procedure and results in a permanent change to the headrest. The modification may also seriously degrade the safety features of the headrest.

The uncovered monitor is very attractive to thieves. It is easily visible from outside the vehicle.

The uncovered monitor has a very hard surface. This makes the back of the headrest a safety hazard for those seated behind it.

A monitor cover would also provide a degree of parental viewing control over the headrest monitor. Covering the monitor would prevent rear seat viewing.

Currently, there is no way for the front seat passengers to control the operation of the headrest monitors directly. No remote control is available. A remote control would permit command of the use of the headrest monitor. This would allow parental control.

These monitors have the video input and power supply cable run outside of the headrest support pillar. This lends an unfinished look to the assembly. It also leaves the cable vulnerable to damage from vehicle occupants.

What is needed is a reasonably priced, OEM headrest restraint made specifically for the vehicle maintaining the safety requirements of the headrest while incorporating a rearward facing, remote-controlled, video monitor with a monitor safety cover and concealed video input and power supply cable.

BRIEF SUMMARY OF THE INVENTION

An embodiment of the invention has a headrest-restraint incorporating a remote-controlled, video monitor with a monitor safety cover and concealed video input and power supply cable. It can serve as an OEM headrest or serve as an after-market headrest replacement. This embodiment of the invention maintains headrest safety requirements, unlike headrests specially modified to incorporate a rearward facing video monitor. The monitor safety cover protects rear seat occupants from impact with the monitor.

Unlike specially modified headrests, this embodiment of the invention is specifically designed to meet the vehicle manufacturer's specifications. The design of the headrest accommodates the monitor without compromising the support structure and safety, instead of merely removing headrest structure to house a monitor. The headrest padding on the front of the unit is sufficient to absorb head impact and transfer this load into the support structure. The support structure is strong enough to safely react impact loads into the upper seat structure.

The headrest has the video input and power supply cable run up through a hollow headrest support pillar. This gives the assembly a built-in, original equipment appearance. The hollow headrest support pillar also protects the cable.

The padded monitor cover serves a number of purposes. The combination of the concealed monitor power and video input cable and the padded cover gives the headrest the appearance of an ordinary headrest. The cover conceals the monitor. This may help to reduce the chances of headrest theft through auto burglary.

The padded cover also serves to reduce injury due to impact with the monitor. Those seated behind the monitor will have some measure of protection from impact against the hard monitor.

The monitor cover also provides a degree of parental viewing control over the headrest monitor. Covering the monitor prevents rear seat viewing.

The padded cover also protects the monitor from damage when it is not in use.

A remote control commands the operation of the video display monitors. The Remote control generated infrared signals or radio signals command the functions of the video display monitor. The remote control allows rear seat or even front seat passengers to control the operation of the headrest monitors directly. This feature allows parental control of the video display monitor.

The headrest can be tilted in relation to the at least one hollow engagement pillar to three forward tilt positions. Each forward tilt position is locked into place by a ratcheting mechanism. This feature allows the seat occupant to increase their comfort and/or promotes a better monitor-viewing angle for passengers of varying heights.

An embodiment of the invention incorporates a headrest cover. The sleeve-like cover slides over the entire headrest to protect it from wear and further conceal it. The cover can have a matching or contrasting color and texture.

An OEM is a company that uses product components from one or more other companies to build a product that it sells under its own company name and brand. The term is sometimes used to refer to a company that supplies the components. The intended use of an OEM component is to be sold as part of a complete system instead of as an individual component.

An aftermarket component is a part or accessory made by an independent manufacturer for a specific vehicle, but which may or may not meet the vehicle manufacturer's specifications.

The foregoing has outlined the more pertinent and important features of the present invention in order that the detailed description of the invention that follows may be better. Additional features of the present invention will be described hereinafter, which form the subject of the claims. It also should be realized by those skilled in the art that equivalent constructions and methods do not depart from the spirit and scope of the inventions as set forth in the appended claims.

BRIEF DESCRIPTION OF THE DRAWINGS

The invention will be more fully understood by reference to the following drawings that are for illustrative purposes only:

FIG. 2 is an exploded perspective view of the components of the vehicle headrest with a built-in video display device;

FIG. 3 is a perspective view of the assembly order of the components of the vehicle headrest with a built-in video display device;

FIG. 12 is a rear view of the vehicle headrest with a hinged monitor cover in the open position;

FIG. 13 is a side view of the vehicle headrest with a hinged monitor cover in the open position;

DETAILED DESCRIPTION

Figure 1:
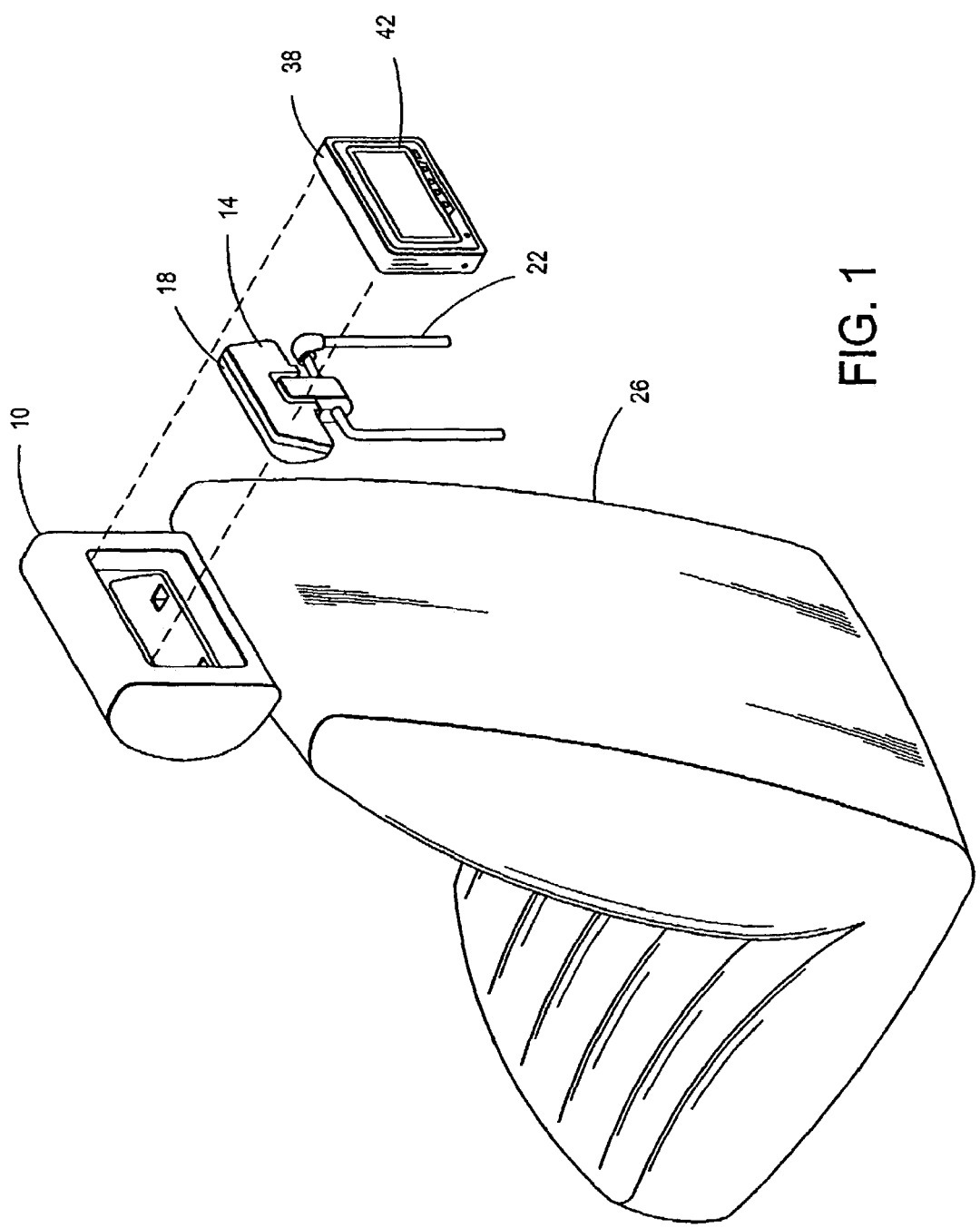
FIG. 1 is a perspective view of a passenger seat with the vehicle headrest with a built-in video display device.
Figure 4:
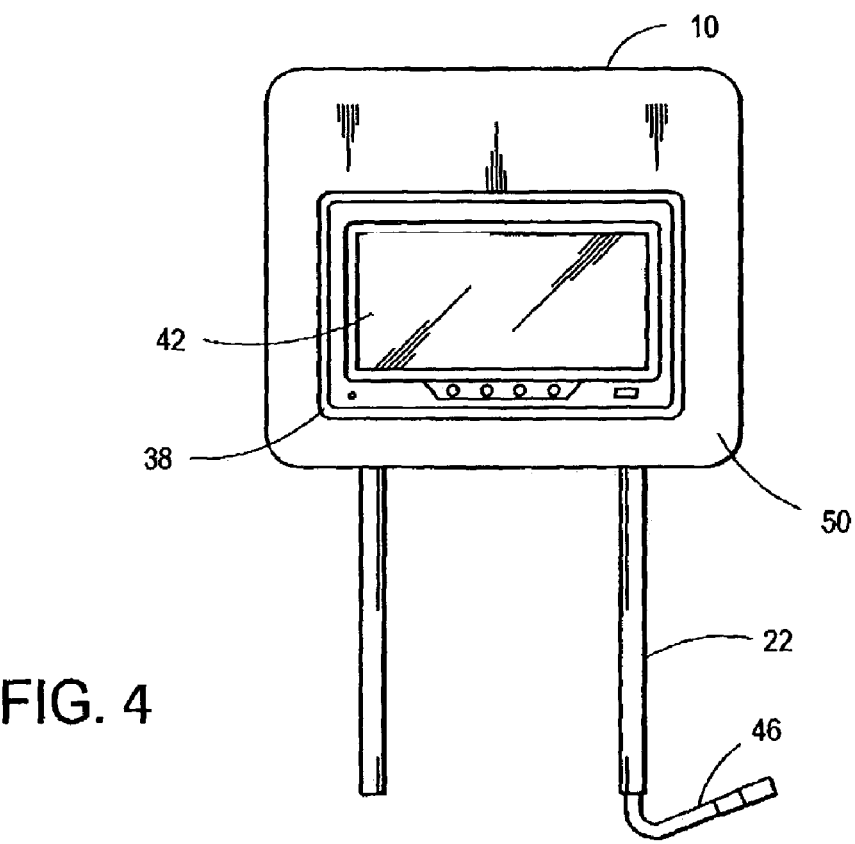
FIG. 4 is a rear elevation view of the vehicle headrest, normal to the monitor display screen.
Figure 5:
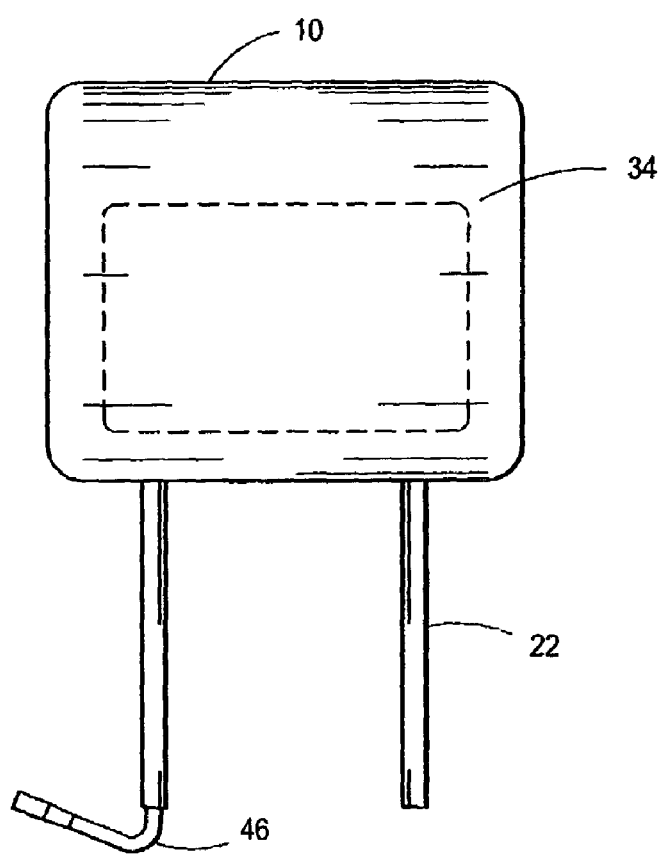
FIG. 5 is a front elevation view of the vehicle headrest with a built-in video display device.

The invention resides in a vehicle headrest with a rearward facing, built-in active matrix TFT LCD monitor. As shown in FIGS. 1–3, the headrest has a frame 14. The frame 14 has a headrest support 18 and at least one hollow pillar 22. The at least one hollow pillar 22 connects the headrest support 18 to the seat 26.

The headrest pillow 30 has a rearward structure 50 and a yielding forward structure 34 sized, shaped and located to prevent the back of the seat occupant's head from a sudden, whipping rearward motion. The headrest pillow 30 connects to the headrest support. The size and shape of rearward structure 50 of the headrest pillow 30 accommodates a video display device 38. The video display device 38 has a display screen 42 and a combination power and video input cable 46.

As shown in FIGS. 2–9 and 11, the power and video input cable 46 runs through the at least one hollow pillar 22.

The at least one hollow pillar 22 has a vertical adjustment mechanism permitting it to adjust to a plurality of vertical positions in relation to seat 26.

In a variant of this invention, the combination power and video input cable 46 runs, or extends, through the seat 26, through the at least one hollow pillar 22 to connect to the video display device 38.

Shown in FIGS. 2 and 3, the headrest pillow 30 includes a shaped foam pad 54 covered by a material 58 similar in appearance, color and texture to the material covering the seat 26 onto which it is mounted.

In an embodiment of this invention, the video display device 38 is an active matrix TFT LCD monitor.

In another embodiment of this invention, the frame 14 has two pillars 22 with at least one post being hollow.

Figure 6:
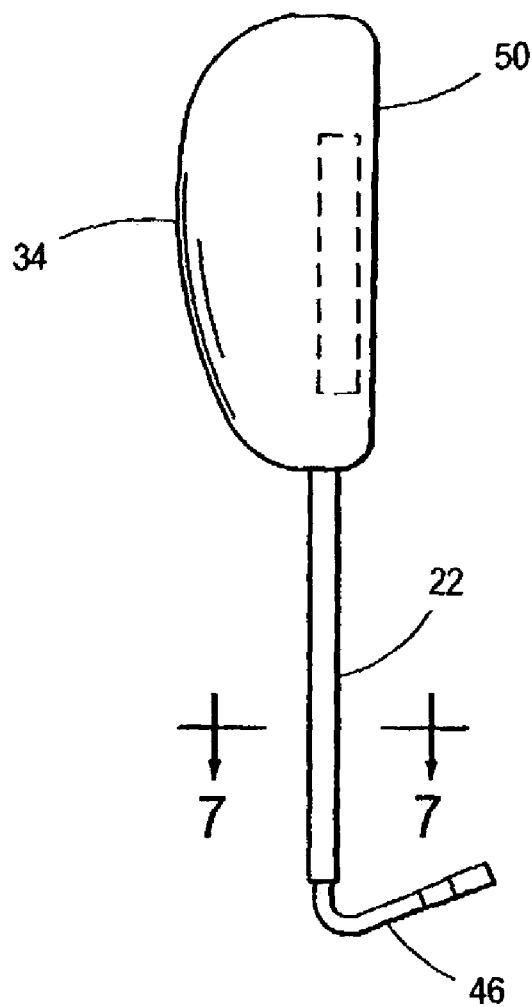
FIG. 6 is a side elevation view of the vehicle headrest with a built-in video display device.
Figure 7:
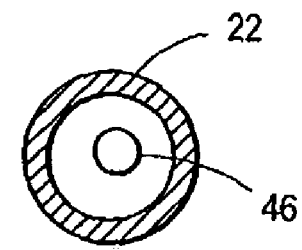
FIG. 7 is a cross-sectional view of a hollow engagement post and DIN cable, the section cut is normal to the centerline of the post.
Figure 8:
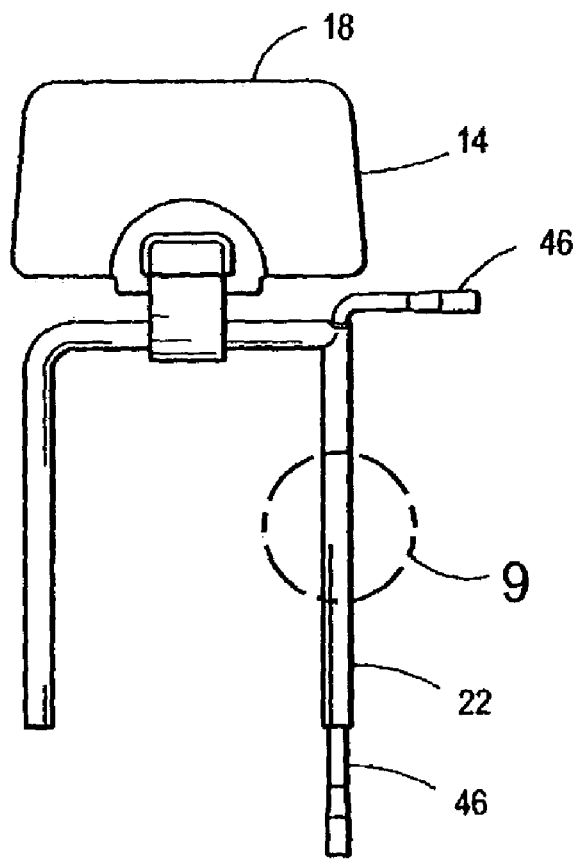
FIG. 8 is a rear elevation view of the headrest support and two engagement posts with at least one engagement post having a din cable run through its hollow interior.
Figure 9:
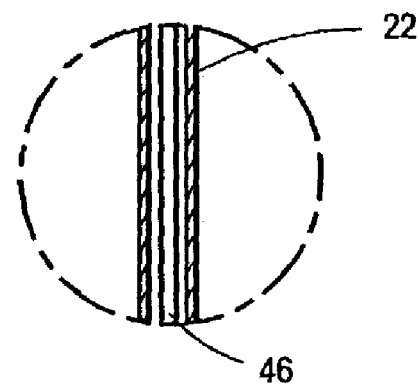
FIG. 9 is a cross-sectional view of a hollow engagement post and din cable, with the section cut parallel to the centerline of the post.

In the embodiment of the invention, FIGS. 6 and 7 depicts a hollow pillar 22. This type of pillar can be fabricated from a Chrome-moly steel tube.

Figure 10:
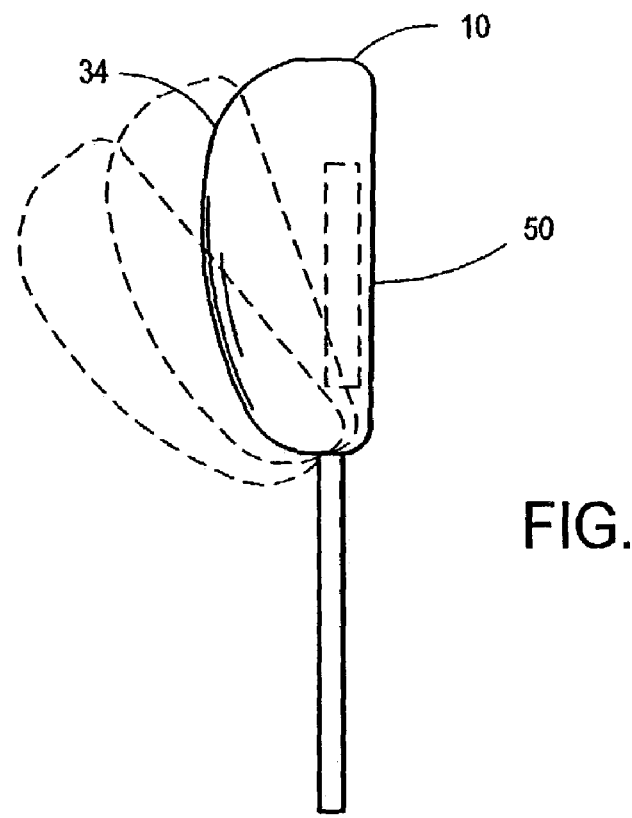
FIG. 10 is a side elevation view of the vehicle headrest with a built-in video display device illustrating the plurality of forward tilt positions.
Figure 11:
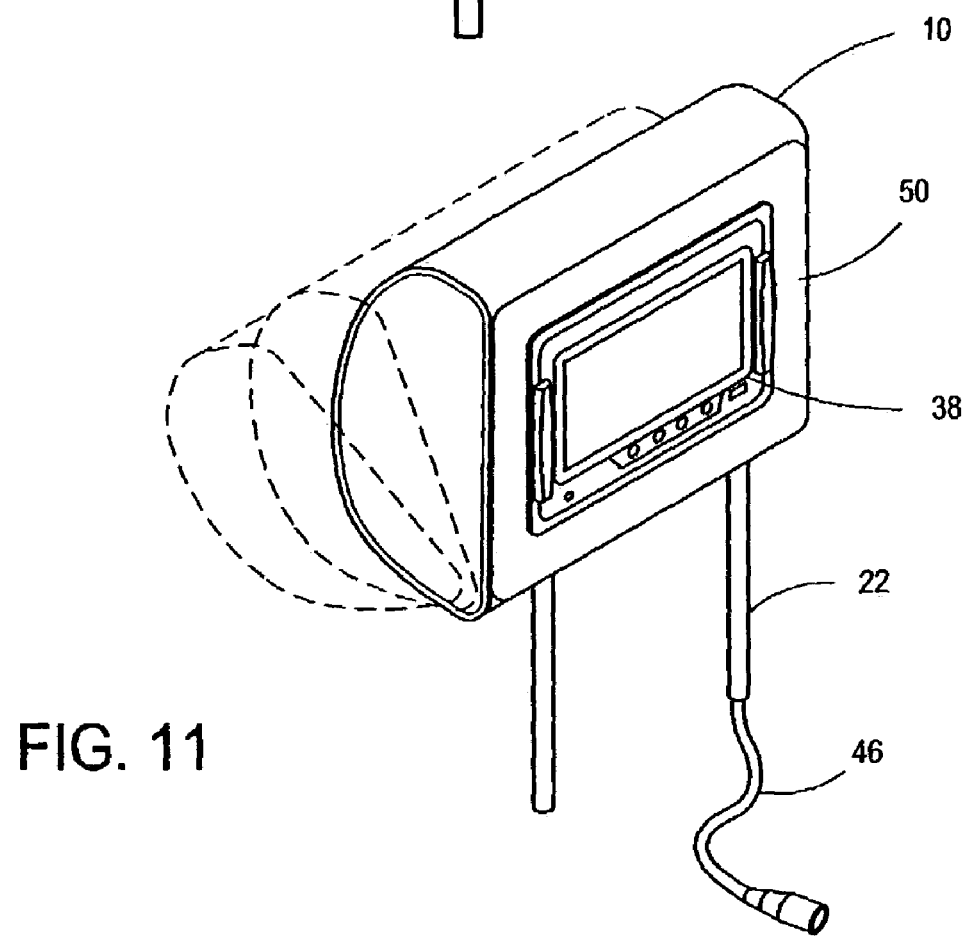
FIG. 11 is a perspective view of the vehicle headrest with a built-in video display device illustrating the plurality of forward tilt positions.

In another variation of this invention, shown in FIGS. 10 and 11, the headrest support 18 can be tilted in relation to the at least one hollow pillar 22 to three forward tilt positions. Each forward tilt position is locked into place by a ratcheting mechanism.

The rearward structure 50 of the headrest pillow 30 contains an opening 70, shown in FIGS. 1–3. The opening, viewed from the back of the headrest looking forward, has a top side, a bottom side, a right side, a left side and a forward side.

A video display housing 94 is sized and shaped to fit within the opening 70 in the headrest pillow 30. The video display housing 94 may be fabricated from ABS plastic.

The video display housing 94 has a monitor attachment bezel 98 mounted into it. The monitor attachment bezel 98 attaches the video display device 38 to the video display housing 94.

Two brackets 102 attach the video display device 38 to the monitor attachment bezel 98.

In an embodiment of the invention, the combination power and video input cable 46 is a DIN cable. A DIN Cable is commonly used for audio and control applications. The DIN cable can be a 5-pin DIN cable or an 8-pin DIN cable. The 5-pin DIN cable connector is capable of insertion through the hollow tube.

The padded monitor cover serves a number of purposes. The combination of the concealed monitor power and video input cable and the padded cover gives the headrest the appearance of an ordinary headrest. The cover conceals the monitor. This may help to reduce the chances of headrest theft through auto burglary.

FIGS. 12 through 15 disclose two embodiments of the padded video display cover. FIGS. 12 and 13 depict a hinged cover 109 that opens upward. The hinge 107 holds the cover 109 in the open position. The location of the hingeably attached cover 109 is on the rearward structure 50 above the video display housing 94. The padded video display cover 109 conceals the monitor 42 when closed. The outer surface 112 of the padded cover 109 can be somewhat rigid or pliable. The texture and the color of the cover 109 can match or contrast with the headrest. The padding can be open or closed cell foam or any other suitable material.

Figures 14, 15:
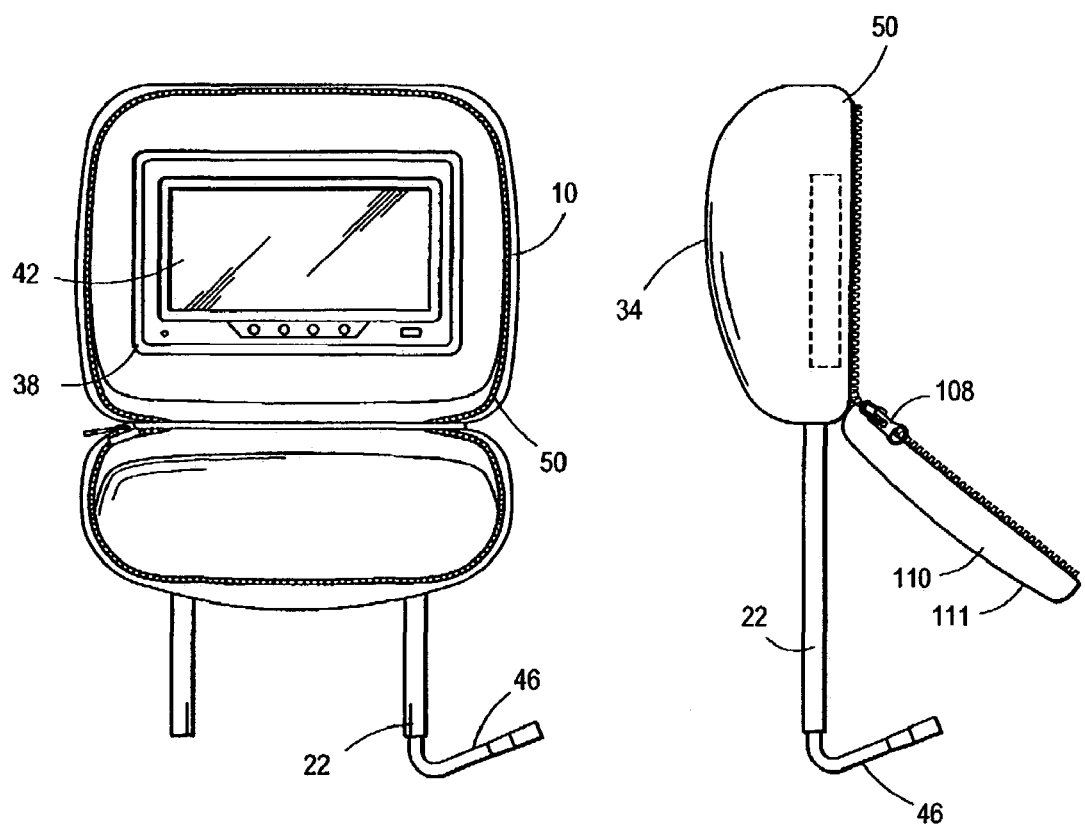
FIG. 14 is a rear view of the vehicle headrest with a zippered perimeter monitor cover in the open position.
FIG. 15 is a side view of the vehicle headrest with a zippered perimeter monitor cover in the open position.

FIGS. 14 and 15 depict a hinged cover that opens downward. The cover 110 is hingeably attached to the rearward structure 50 below the video display housing 94. A zipper 108 attaches the perimeter of the cover 110 to the rearward structure 50. When closed, the padded video display cover 110 conceals the monitor. When unzipped, gravity holds the cover 110 open. The outer surface 111 of the padded cover 110 can be somewhat rigid or pliable. The texture and the color of the cover 110 can match or contrast with the headrest. The padding can be open or closed cell foam or any other suitable material.

Figure 16:
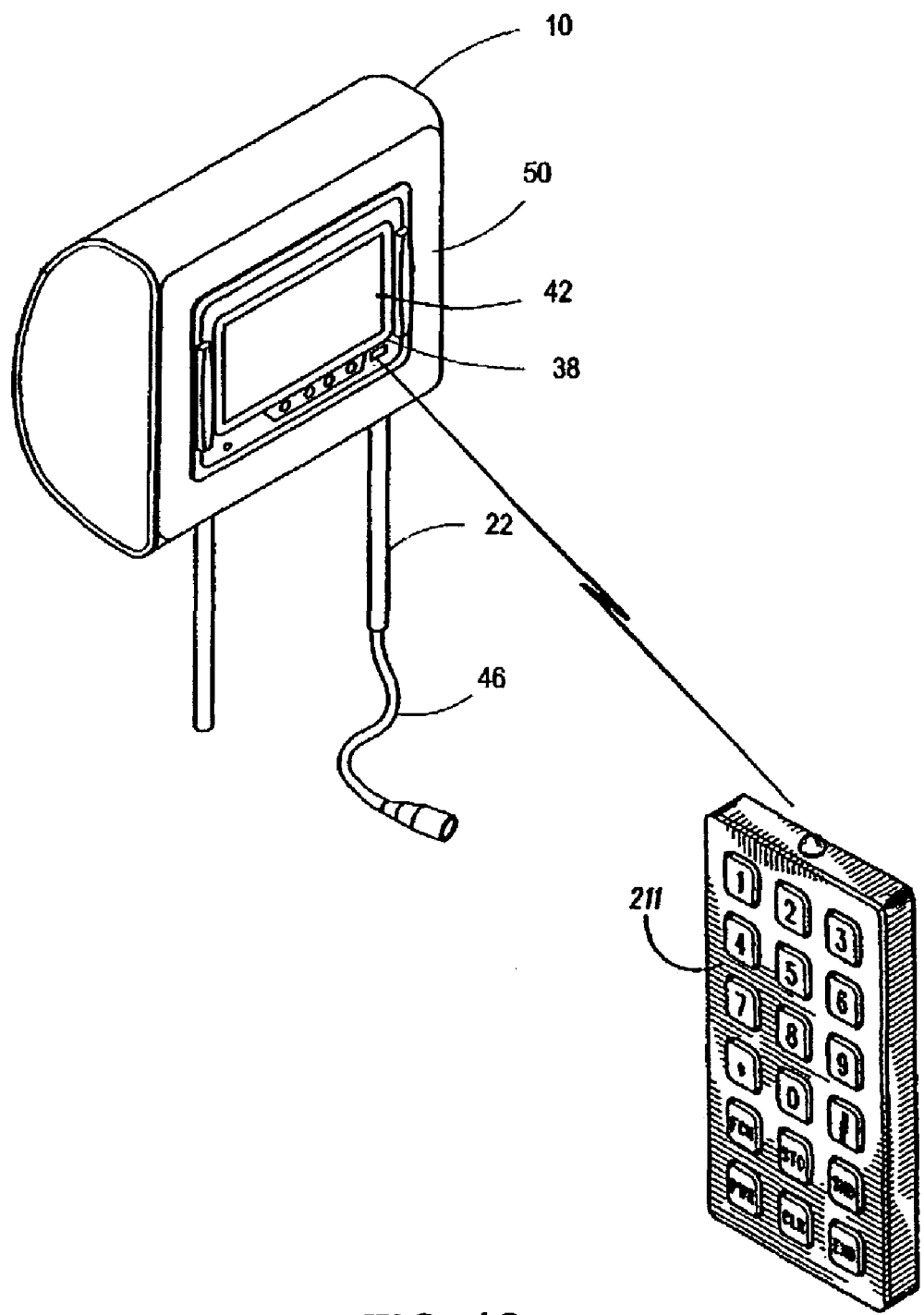
FIG. 16 depicts the control of the monitor by a remote control.

A remote control 211 commands the operation of the video display monitor 42, as shown in FIG. 16. The remote control generated infrared signals or radio signals command the function of the video display monitor 42. The remote control 211 allows rear seat or even front seat passengers to control the operation of the video display monitor 42 directly.

The present disclosure includes that contained in the present claims as well as that of the foregoing description. Although this invention has been described in its preferred forms with a certain degree of particularity, it is understood that the present disclosure of the preferred forms has been made only by way of example and numerous changes in the details of construction and combination and arrangement of parts may be resorted to without departing from the spirit and scope of the invention. Accordingly, the scope of the invention should be determined not only by the embodiments illustrated, but by the appended claims and their legal equivalents.

What is claimed is:

1. A vehicle headrest with a built-in video display device comprising:
   at least one hollow pillar comprising a vertical adjustment mechanism to adjust to a plurality of vertical positions relative to a seat;
   a headrest support tiltably connected to the seat by the at least one hollow pillar for movement in a plurality of forward tilted positions;
   a cable extended through the at least one hollow pillar to provide power and video input to a video display device;
   a headrest pillow attached to a headrest housing support, wherein the headrest pillow comprises a rearward structure and a yielding forward structure, wherein the yielding forward structure is configured to prevent the back of a seat occupant's head from receipt of a sudden, rearward whipping motion upon impact of the seat occupant's head with the headrest pillow, and wherein the rearward structure of the headrest pillow is configured to provide a video display;
   a monitor attachment bezel attached to the video display device within a video display housing; and
   a removable video display device cover hingedly mounted to the rearward structure of the headrest pillow, wherein the removable video display device cover in an open state exposes the video display device and in a closed state protects the video display device.

2. A vehicle headrest with a built-in video display device according to claim 1, wherein the headrest pillow comprises a shaped foam pad core, and wherein the removable video display cover comprises a material similar in appearance, color and texture to a material covering the seat.

3. A vehicle headrest with a built-in video display device according to claim 1, wherein the headrest pillow comprises a shaped foam pad core, wherein the removable video display cover comprises a material complementary in appearance, color and texture to the material covering the seat the vehicle headrest is herein mounted.

4. A vehicle headrest with a built-in video display device according to claim 1, wherein the video display device is a LCD monitor.

5. A vehicle headrest with a built-in video display device according to claim 1, wherein the at least one hollow pillar comprises chrome-molly tubing.

6. A vehicle headrest with a built-in video display device according to claim 1, wherein the plurality of forward tilted positions are adjustable to three forward tilted positions.

7. A vehicle headrest with a built-in video display device according to claim 6, further comprising a ratcheting mechanism for locking the seat into one of the plurality of forward tilted positions.

8. A vehicle headrest with a built-in video display device according to claim 1, wherein the rearward structure of the headrest pillow contains an opening having a top side, a bottom side, a right side, a left side and a forward side.

9. A vehicle headrest with a video display device according to claim 8, further comprising a headrest housing being sized and shaped to fit within the opening in the headrest pillow with the video display device.

10. A vehicle headrest with a built-in video display device according to claim 1, further comprising at least one bracket to mount the video display device to the monitor attachment bezel.

11. A vehicle headrest with a built-in video display device according to claim 1, further comprising a DIN cable to provide power and video input.

12. A vehicle headrest with a built-in video display device according to claim 1, wherein the removable video display device cover is padded.

13. A vehicle headrest with a built-in video display device according to claim 1, further comprising a remote control for commanding the video display device.

14. A vehicle headrest with a built-in video display device according to claim 13, wherein the remote control employs an infrared signal to command the video display device.

15. A vehicle headrest with a built-in video display device according to claim 13, wherein the remote control employs a radio signal to command the video display device.

16. A vehicle headrest with built-in video display device comprising:
   at least one hollow pillar, said at least one hollow pillar having a vertical adjustment mechanism that allows it to be adjusted vertically to a plurality of vertical positions in relation to the seat on which it is mounted;

a headrest support, said headrest support being connected to the seat by said at least one hollow pillar, said headrest support being tilt-able in relation to said at least one hollow pillar to a plurality of forward tilted positions, each forward tilted position being locked into place by a ratcheting mechanism;

a seat;

a video display device, said video display device being an active matrix TFT LCD monitor;

a cable to provide power and video input to said video display device, said cable being a 5-pin DIN cable;

a headrest housing, said headrest housing being sized and shaped to house said video display device;

a headrest pillow being attached to said headrest support, said headrest pillow having a shaped foam pad core with a rearward structure and a yielding forward structure and a cover, said yielding forward structure being sized, shaped and located to prevent the back of the seat occupant's head from a sudden, rearward whipping motion, the rearward structure of said headrest pillow being sized and shaped to house said headrest housing;

a monitor attachment bezel, said monitor attachment bezel attaches said video display device into said headrest housing; and said cable extends through said at least one hollow pillar into and through the seat.

17. A vehicle headrest with built-in video display device comprising:

at least one hollow pillar, said at least one hollow pillar having a vertical adjustment mechanism that allows it to be adjusted vertically to a plurality of vertical positions in relation to the seat on which it is mounted;

a headrest support, said headrest support being connected to the seat by said at least one hollow pillar, said headrest support being tilt-able in relation to said at least one hollow pillar to a plurality of forward tilted positions, each forward tilted position being locked into place by a ratcheting mechanism;

a seat;

a video display device, said video display device being an active matrix TFT LCD monitor;

a remote control to command said video display device;

a cable to provide power and video input to said video display device, said cable being a 5-pin DIN cable;

a headrest housing, said headrest housing being sized and shaped to house said video display device and fit into said opening in said rearward structure;

a headrest pillow being attached to said headrest support, said headrest pillow having a shaped foam pad core with a rearward structure and a yielding forward structure and a cover, said yielding forward structure being sized, shaped and located to prevent the back of the seat occupant's head from a sudden, rearward whipping motion, the rearward structure of said headrest pillow being sized and shaped to house said headrest housing;

a monitor attachment bezel, said monitor attachment bezel attaches said video display device into said headrest housing;

a padded video display device cover being hingedly mounted to the rearward structure of said headrest pillow; and said cable extends through said at least one hollow pillar into and through the seat.

* * * * *